United States Patent
Lundström

(10) Patent No.: US 12,246,287 B2
(45) Date of Patent: Mar. 11, 2025

(54) METHOD FOR ADAPTION OF AN EXHAUST TREATMENT SYSTEM

(71) Applicant: Scania CV AB, Södertälje (SE)

(72) Inventor: Johan Lundström, Järna (SE)

(73) Assignee: Scania CV AB, Södertälje (SE)

( * ) Notice: Subject to any disclaimer, the term of this patent is extended or adjusted under 35 U.S.C. 154(b) by 216 days.

(21) Appl. No.: 17/791,961

(22) PCT Filed: Jan. 12, 2021

(86) PCT No.: PCT/SE2021/050011
§ 371 (c)(1),
(2) Date: Jul. 11, 2022

(87) PCT Pub. No.: WO2021/150155
PCT Pub. Date: Jul. 29, 2021

(65) Prior Publication Data
US 2023/0037326 A1    Feb. 9, 2023

(30) Foreign Application Priority Data

Jan. 23, 2020 (SE) .................................. 2050060-9

(51) Int. Cl.
*B01D 53/94* (2006.01)
*B01D 46/00* (2022.01)
(Continued)

(52) U.S. Cl.
CPC ..... *B01D 53/9495* (2013.01); *B01D 46/0027* (2013.01); *B01D 53/9409* (2013.01);
(Continued)

(58) Field of Classification Search
CPC ............ B01D 53/9495; B01D 46/0027; B01D 53/9409; B01D 53/9477; B01D 2255/904;
(Continued)

(56) References Cited

U.S. PATENT DOCUMENTS

2002/0148220 A1   10/2002   Patchett et al.
2010/0154386 A1   6/2010   Perrin et al.
(Continued)

FOREIGN PATENT DOCUMENTS

CN   106062332 A   10/2016
CN   107923282 A   4/2018
(Continued)

OTHER PUBLICATIONS

Scania CV AB, International Patent Application No. PCT/SE2021/050011, International Search Report, Jan. 29, 2021.
(Continued)

*Primary Examiner* — Brandon D Lee
(74) *Attorney, Agent, or Firm* — Moore & Van Allen PLLC; W. Kevin Ransom

(57) ABSTRACT

The present invention relates to a method for adaption of an exhaust treatment system arranged for treating an exhaust stream produced by an engine, where the exhaust treatment system includes at least a first additive dosage device, a first selective catalytic reduction catalyst arranged downstream of the first additive dosage device, a second additive dosage device arranged downstream of the first selective catalytic reduction catalyst, and a second selective catalytic reduction catalyst arranged downstream of the second additive dosage device. The method includes initiating an adaption of the second selective catalytic reduction catalyst, and controlling, during the adaption of the second selective catalytic reduction catalyst, the first additive dosage device to inject additive in accordance with at least one injection rule being designed for the adaption.

12 Claims, 4 Drawing Sheets

(51) Int. Cl.
  *F01N 3/10* (2006.01)
  *F01N 3/20* (2006.01)
  *F01N 13/00* (2010.01)

(52) U.S. Cl.
  CPC ......... *B01D 53/9477* (2013.01); *F01N 3/106* (2013.01); *F01N 3/108* (2013.01); *F01N 3/208* (2013.01); *F01N 13/009* (2014.06); *B01D 2255/904* (2013.01); *B01D 2255/915* (2013.01); *B01D 2258/01* (2013.01); *B01D 2258/012* (2013.01); *B01D 2279/30* (2013.01); *F01N 2560/026* (2013.01); *F01N 2900/16* (2013.01)

(58) Field of Classification Search
  CPC .......... B01D 2255/915; B01D 2258/01; B01D 2258/012; B01D 2279/30; B01D 53/9418; F01N 3/106; F01N 3/108; F01N 3/208; F01N 13/009; F01N 2560/026; F01N 2900/16; F01N 3/021; F01N 3/2066; F01N 2560/14; F01N 2570/18; F01N 2610/02; F01N 2610/1453; F01N 2610/146; F01N 2900/1402; F01N 2900/1621; F01N 13/0093; F01N 9/00; F01N 11/00; F01N 2570/14; F01N 2610/03; Y02A 50/20; Y02C 20/10; Y02T 10/12
  See application file for complete search history.

(56) References Cited

U.S. PATENT DOCUMENTS

| | | | |
|---|---|---|---|
| 2011/0085954 A1 | 4/2011 | Doring et al. | |
| 2013/0232958 A1 | 9/2013 | Ancimer et al. | |
| 2015/0020506 A1* | 1/2015 | Johansen | F01N 3/035 60/274 |
| 2015/0147250 A1 | 5/2015 | Nigro et al. | |
| 2017/0130629 A1 | 5/2017 | Nagel et al. | |
| 2018/0087426 A1* | 3/2018 | Dou | F01N 11/002 |
| 2018/0163589 A1 | 6/2018 | David et al. | |
| 2018/0221819 A1 | 8/2018 | Nilsson et al. | |
| 2018/0221820 A1 | 8/2018 | Nilsson et al. | |
| 2018/0223759 A1 | 8/2018 | Nilsson et al. | |
| 2018/0230875 A1 | 8/2018 | Nilsson et al. | |
| 2018/0258811 A1 | 9/2018 | Nilsson | |
| 2018/0258821 A1 | 9/2018 | Masubuchi et al. | |
| 2019/0078481 A1 | 3/2019 | Schweizer | |
| 2021/0095590 A1* | 4/2021 | Bastoreala | G01M 15/102 |
| 2021/0131332 A1* | 5/2021 | Binetti | F01N 3/208 |

FOREIGN PATENT DOCUMENTS

| | | |
|---|---|---|
| CN | 107923290 A | 4/2018 |
| DE | 102006031659 A1 | 1/2008 |
| DE | 102018110452 A1 | 7/2018 |
| JP | 2012007557 A | 1/2012 |
| JP | 2019070326 A | 5/2019 |
| WO | 2014007752 A1 | 1/2014 |
| WO | 2014014399 A1 | 1/2014 |
| WO | 2015130212 A1 | 9/2015 |
| WO | 2018013039 A1 | 1/2018 |
| WO | 2019059837 A1 | 3/2019 |

OTHER PUBLICATIONS

Scania CV AB, International Patent Application No. PCT/SE2021/050011, Written Opinion, Jan. 29, 2021.
Scania CV AB, Swedish Patent Application No. 2050060-9, Office Action, Sep. 11, 2020.
Scania CV AB, European Patent Application No. 21744832.3, Extended European Search Report, Oct. 13, 2023.
Scania CV AB, International Patent Application No. PCT/SE2021/050011, International Preliminary Report on Patentability, Jul. 26, 2022.
Scania CV AB, Chinese Patent Application No. 202180007356.6, First Office Action, Apr. 18, 2024.
Hong-Yi, Dong, et al., "Application of NOx Selective Catalytic Reduction by Ethanol over Ag/Al2O3 Catalyst", Transactions of Csice, Nov. 25, 2007, pp. 56-62, vol. 06.
Chen, Ning, et al., "Research Progress of SCR Flue Gas Denitrification System for Ships", Shipbuilding Science & Technology, Nov. 15, 2017, pp. 11-16, vol. 04.
Scania CV AB, Brazilian Patent Application No. BR112022013074-0, Preliminary Office Action, Apr. 15, 2024.

* cited by examiner

METHOD FOR ADAPTION OF AN EXHAUST TREATMENT SYSTEM

CROSS-REFERENCE TO RELATED APPLICATIONS

This application is a National Stage Patent Application (filed under 35 § U.S.C. 371) of PCT/SE2021/050011, filed Jan. 12, 2021, of the same title, which, in turn claims priority to Swedish Patent Application No. 2050060-9 filed Jan. 23, 2020, of the same title; the contents of each of which are hereby incorporated by reference.

FIELD OF THE INVENTION

The present application pertains to a method in connection with exhaust treatment system for vehicles and in particular a method for adaption of components comprised in the exhaust treatment system.

BACKGROUND OF INVENTION

In connection with increased government interests concerning pollution and air quality, primarily in urban areas, emission standards and regulations regarding emissions from combustion engines have been drafted in many jurisdictions.

Such emission standards often consist of requirements defining acceptable limits of exhaust emissions from combustion engines. For example, emission levels of nitrogen oxides $NO_x$, hydrocarbons $C_xH_y$, carbon monoxide CO and particles PM are often regulated by such standards for most types of vehicles. Vehicles equipped with combustion engines typically give rise to such emissions in varying degrees.

In an effort to comply with these emission standards, the exhausts caused by the combustion of the combustion engine are treated (purified). A common way of treating exhausts from a combustion engine consists of a so-called catalytic purification process, which is why vehicles equipped with a combustion engine usually comprise at least one catalyst. There are different types of catalysts, where the different respective types may be suitable depending on for example the combustion concept, combustion strategies and/or fuel types which are used in the vehicles, and/or the types of compounds in the exhaust stream to be purified. In relation to at least nitrous gases (nitrogen monoxide, nitrogen dioxide), referred to below as nitrogen oxides $NO_x$, vehicles often comprise a catalyst, wherein an additive is supplied to the exhaust stream resulting from the combustion in the combustion engine, in order to reduce nitrogen oxides $NO_x$, primarily to nitrogen gas and aqueous vapor.

SCR (Selective Catalytic Reduction) catalysts are a commonly used type of catalyst for this type of reduction, primarily for heavy goods vehicles. SCR catalysts usually use ammonia NH3, or a composition from which ammonia may be generated/formed, as an additive to reduce the amount of nitrogen oxides NOx in the exhausts. The additive is injected into the exhaust stream resulting from the combustion engine upstream of the catalyst. The additive added to the catalyst is adsorbed (stored) in the catalyst, in the form of ammonia NH3, so that a redox-reaction may occur between nitrogen oxides $NO_x$ in the exhausts and ammonia NH3 available via the additive.

In order to adhere to even stricter exhaust emission demands and legislations, many exhaust systems are provided with two SCR catalysts, where one can have the dual function of catching soot and other particles in the exhaust stream. The use of dual SCR catalysts provides much larger possibilities of treating $NO_x$ while at the same time optimize the fuel efficiency of the combustion engine. Specifically, there is a correlation between the exhaust treatment system's ability to reduce nitrogen oxides $NO_x$ and the fuel efficiency of the combustion engine. For the combustion engine, there is a correlation between the engine's fuel efficiency/total efficiency and the nitrogen oxides $NO_x$ produced by it. This correlation specifies that for a given system there is a positive connection between nitrogen oxides $NO_x$ produced and fuel efficiency, in other words an engine that is permitted to emit more nitrogen oxides $NO_x$ may be induced to consume less fuel by way of, for example, a more optimal selection of the injection timing, which may yield a higher combustion efficiency.

Similarly, there is often a negative correlation between a produced particle mass PM and the fuel efficiency, meaning that an increased emission of particle mass PM from the engine is connected with an increased fuel consumption. This correlation is the background to the widespread use of exhaust treatment systems comprising an SCR-catalyst, where the intention is the optimization of the engine regarding fuel consumption and emission of particles, towards a relatively larger amount of nitrogen oxides $NO_x$ produced. A reduction of these nitrogen oxides $NO_x$ is then carried out in the exhaust treatment system, which thus may comprise an SCR catalyst. Through an integrated approach in the design of the engine and exhaust treatment system, where the engine and exhaust treatment complement each other, a high fuel efficiency may therefore be achieved jointly with low emissions of both particles PM as well as nitrogen oxides $NO_x$.

The exhaust systems described above are controlled with suitable control systems that are capable of measuring different parameters such as temperature in various components and $NO_x$ ratios just to mention some and to use these measurements for controlling for instance the supply of additives. The control system is then working continuously with continuous feedback adjusting the performance of the exhaust system depending on varying driving conditions.

However, the exhaust system and its components will be affected and alter their properties when used over time. From time to time it is therefore advantageous to perform controls and adaptions of the system and in particular vital components of the system such as SCR catalysts close to the outlet end of the exhaust system, often called main SCR's in dual SCR exhaust systems, where for instance the conversion rate is measured and checked. One problem in that respect is that components upstream may affect the measuring of the conversion rate because for instance NOx sensors only can cover a small part of the volume of the exhaust stream passing in the exhaust pipe, and that there might be inhomogeneities of compounds in the exhaust stream due to disturbance from components upstream, such as a close-coupled SCR, injected additives from a dosage device for the close-coupled SCR, for instance. The inhomogeneities will then negatively affect the accuracy of the measurement by the sensors. Thus, an accurate adaption has to take care of and handle or isolate a number of different error sources.

BRIEF DESCRIPTION OF INVENTION

The aim of the present invention is to handle the above mentioned problems associated with exhaust systems and to provide a more accurate system performance.

According to an aspect of the invention, it comprises a method for adaption of an exhaust treatment system arranged for treating an exhaust stream produced by an engine. The exhaust treatment system may include at least a first additive dosage device, a first selective catalytic reduction catalyst arranged downstream of the first additive dosage device, a second additive dosage device arranged downstream of the first selective catalytic reduction catalyst and a second selective catalytic reduction catalyst arranged downstream of the second additive dosage device.

The method includes initiating an adaption of the second selective catalytic reduction catalyst and controlling, during the adaption of the second selective catalytic reduction catalyst, the first additive dosage device to inject additive in accordance with at least one injection rule being designed for the adaption. Thus, the injection of additives from the first additive dosage device may be based on predefined rules that have been developed for different adaptions of the exhaust treatment system.

For instance, the adaption of the second selective catalytic reduction catalyst may include at least one measurement of a nitrogen oxides conversion rate for the second selective catalytic reduction catalyst. In addition or instead the adaption may mitigate an impact of at least one bias related error. As an alternative or as a further possibility, the adaption may mitigate an impact of at least one error related to a function of the second additive dosage device. Further alternatives are that the adaption may mitigate an impact of at least one error related to a function of the second selective catalytic reduction catalyst and/or that the adaption may mitigate an impact of aging of the second selective catalytic reduction catalyst. As seen, the adaption may be based on a number of different mitigation scenarios.

Moreover, the initiating of the adaption may be triggered by different occurrences such as an end of a predetermined adaption time period $T_{adapt}$, and/or a level of nitrogen oxides NOx in a tailpipe downstream of the second selective catalytic reduction catalyst being higher than a maximum threshold value $NO_{x\_th\_max}$; $NO_x > NO_{x\_th\_max}$; or reverse, that a level of nitrogen oxides $NO_x$ in a tailpipe downstream of the second selective catalytic reduction catalyst is lower than a minimum threshold value $NO_{x\_th\_min}$; $NO_x < NO_{x\_th\_min}$. The trigger points may further be a malfunction of the second selective catalytic reduction catalyst and/or a representative usage of the engine.

The method according to the invention may handle a situation where any or both of the first additive dosage device and the first selective catalytic reduction catalyst causes an inhomogeneity of a distribution of one or more compounds in the exhaust stream. In that situation the controlling of the first additive dosage device may be performed such that an impact of the inhomogeneity of the distribution of one or more compounds in the exhaust stream is limited during the adaption of the second selective catalytic reduction catalyst. In this case the elements of the exhaust treatment system that may cause disturbances and thus errors when measuring for example conversion rate in the second catalytic reduction device are handled such that the impact of the inhomogeneity is as low as possible.

Regarding the injection rules, they may include one or more predetermined injection rule(s) and/or an injection rule causing at least one interruption of an injection of additive by the first additive dosage device and/or an injection rule causing a saturation of additive in the first selective catalytic reduction catalyst.

As an alternative (or as a complement), when any or both of the first additive dosage device and the first selective catalytic reduction catalyst causes an inhomogeneity of distribution of one or more compounds in the exhaust stream, the controlling of the first additive dosage device may performed such that the adaption of the second selective catalytic reduction catalyst mitigates an impact that the inhomogeneity of the distribution of one or more elements in the exhaust stream has on a function of the second selective catalytic reduction catalyst.

With that scenario, the injection rule or rules may include one or more injection rules based on statistical usage data for the engine and/or one or more injection rules corresponding to a normal usage of the engine.

As an example of the above, the first additive dosage device may be a primary source of the inhomogeneity of distribution of one or more compounds in the exhaust stream.

The method may further include measuring a nitrogen oxides $NO_x$ conversion rate for the second selective catalytic reduction catalyst after the controlling of the first additive dosage device. This provides a feedback of the efficiency of the adaption of the exhaust treatment system and in particular the second selective catalytic reduction catalyst.

Preferably, the invention may comprise a computer program comprising instructions which, when the program is executed by a computer, cause the computer to carry out the method. In that regard, a computer-readable medium may also be provided, comprising instructions which, when the program is executed by a computer, cause the computer to carry out the method.

In addition, the invention may comprise a control unit arranged with a method for adaption as outlined above, as well as a vehicle including an exhaust treatment system and the control system.

These and other aspects of, and advantages with, the present invention will become apparent from the following detailed description of the invention and from the accompanying drawings.

BRIEF DESCRIPTION OF DRAWINGS

In the following detailed description of the invention, reference will be made to the accompanying drawings, of which

DETAILED DESCRIPTION OF THE INVENTION

Figure 1:
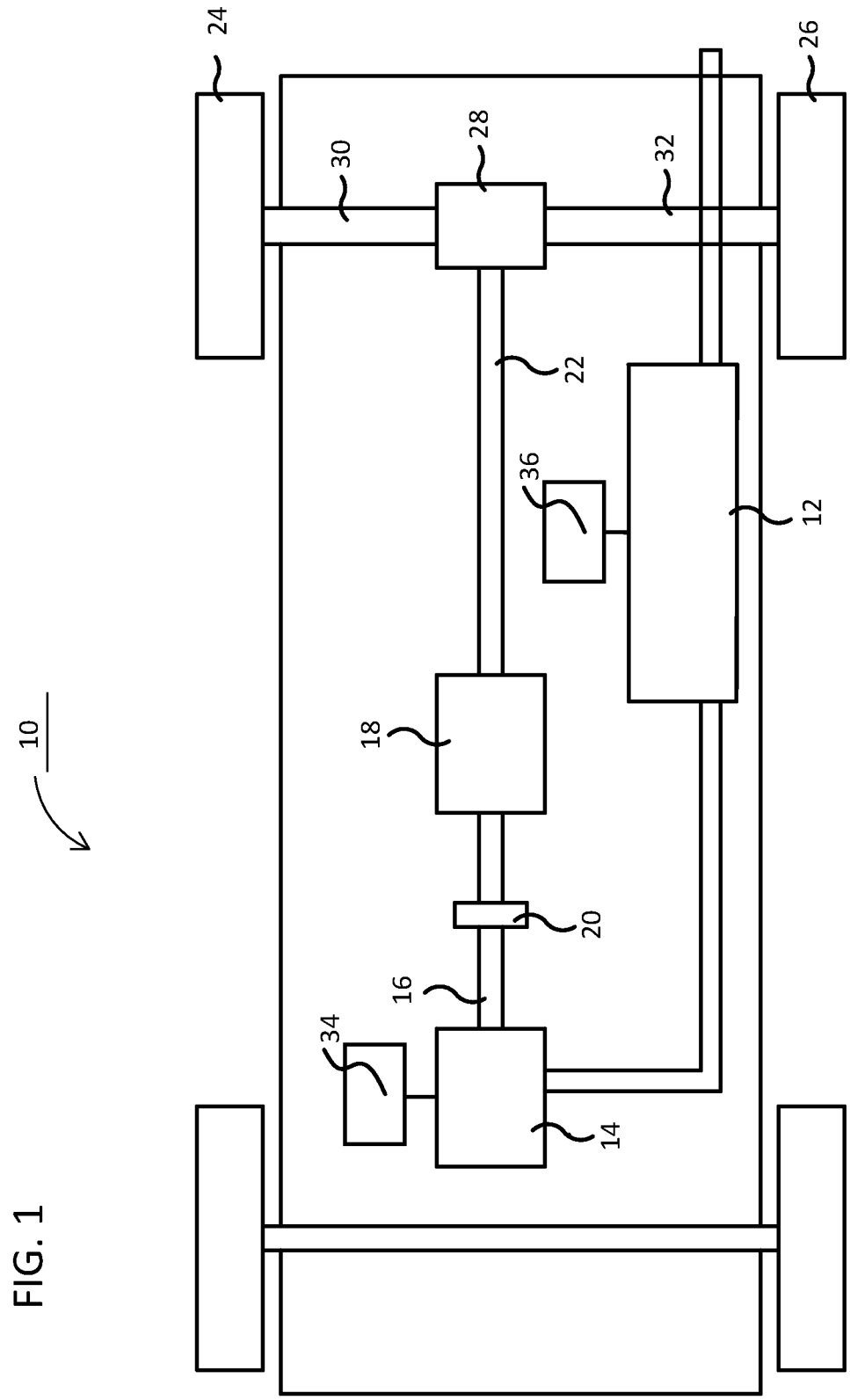
FIG. 1 shows an example vehicle which may comprise embodiments of the present invention.

FIG. 1 schematically shows an example vehicle 10 comprising an exhaust treatment system 12, which may be an exhaust treatment system 12 according to one embodiment of the present invention. The powertrain comprises a combustion engine 14, which in a customary manner, via an output shaft 16 on the combustion engine 14, usually via a flywheel, is connected to a gearbox 18 via a clutch 20.

An output shaft 22 from the gearbox 18 drives wheels 24, 26 via a final drive 28, such as e.g. a customary differential, and the drive shafts 30, 32 connected to said final drive 28.

The combustion engine 14 is controlled by the vehicle's control system via a control device 34, which may be connected to the exhaust treatment system 12 and/or its control device 36. Likewise, the clutch 20 and the gearbox 18 may be controlled by the vehicle's control system, with the help of one or more applicable control devices (not shown). Naturally, the vehicle's powertrain may also be of another type, such as a type with a conventional automatic gearbox, of a type with a hybrid power-train, etc.

The vehicle 10 also comprises an exhaust treatment system/exhaust purification system 12 for treatment/purification of exhaust emissions resulting from combustion in the combustion chambers, which may consist of cylinders, of the combustion engine 14. The exhaust treatment system 12 may be controlled by the vehicle's control system via the control device 36.

Figure 2:
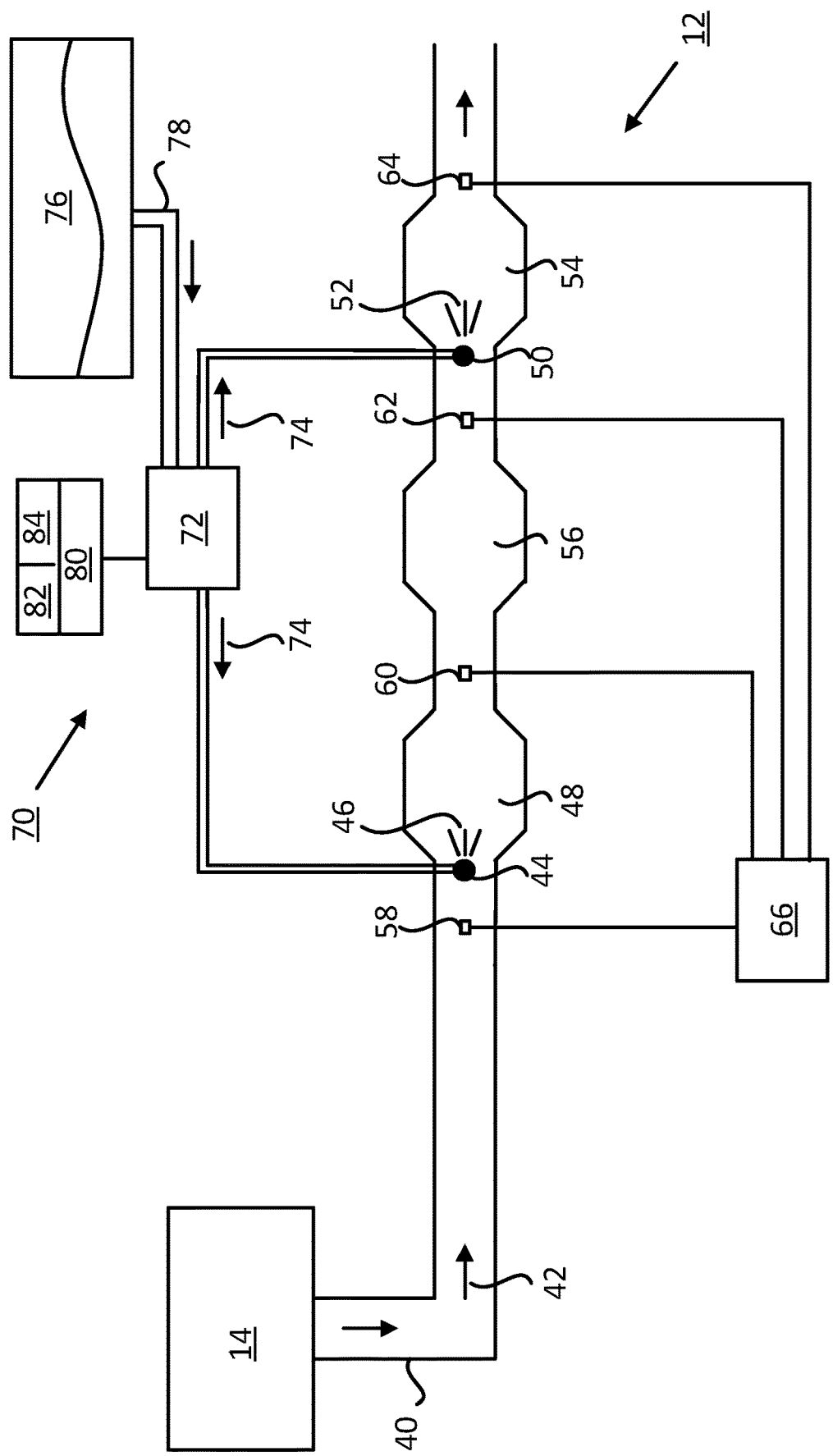
FIG. 2 shows an exhaust treatment system which may comprise embodiments of the present invention.

FIG. 2 schematically shows a non-limiting example of an exhaust treatment system 12, in which the method according to an embodiment of the present invention may be used. In the exhaust treatment system 12, an exhaust conduit 40 is connected to the combustion engine 14, which produces an exhaust stream 42, reaching the conduit 40.

The exhaust treatment system 12 according to an embodiment of the present invention also comprises a first additive dosage device 44, arranged downstream of the engine, in order to carry out a first supply 46 of a first additive into the exhaust stream 42 reaching a first selective catalytic reduction, SCR, catalyst 48, which is arranged to carry out a first reduction of a first amount of nitrogen oxides $NO_{x\_1}$ reaching the first selective catalytic reduction catalyst 48. The catalytic reaction in the first SCR catalyst 48 uses the first additive, supplied into the exhaust stream by the first additive dosage device 44.

The exhaust treatment system 12 further comprises a second additive dosage device arranged downstream of the first selective catalytic reduction catalyst 48, arranged to carry out a second supply 52 of a second additive into the exhaust stream 42 reaching a second selective catalytic reduction, SCR, catalyst 54, which is arranged to carry out a second reduction of a second amount of nitrogen oxides $NO_{x\_2}$ reaching the second selective catalytic reduction catalyst 54. Regarding the first and second selective catalytic reduction catalysts, the first selective catalytic reduction catalyst may be a close coupled selective catalytic reduction catalyst (cc-SCR), and the second selective catalytic reduction catalyst may be a main selective catalytic reduction catalyst (main SCR).

Figure 3:
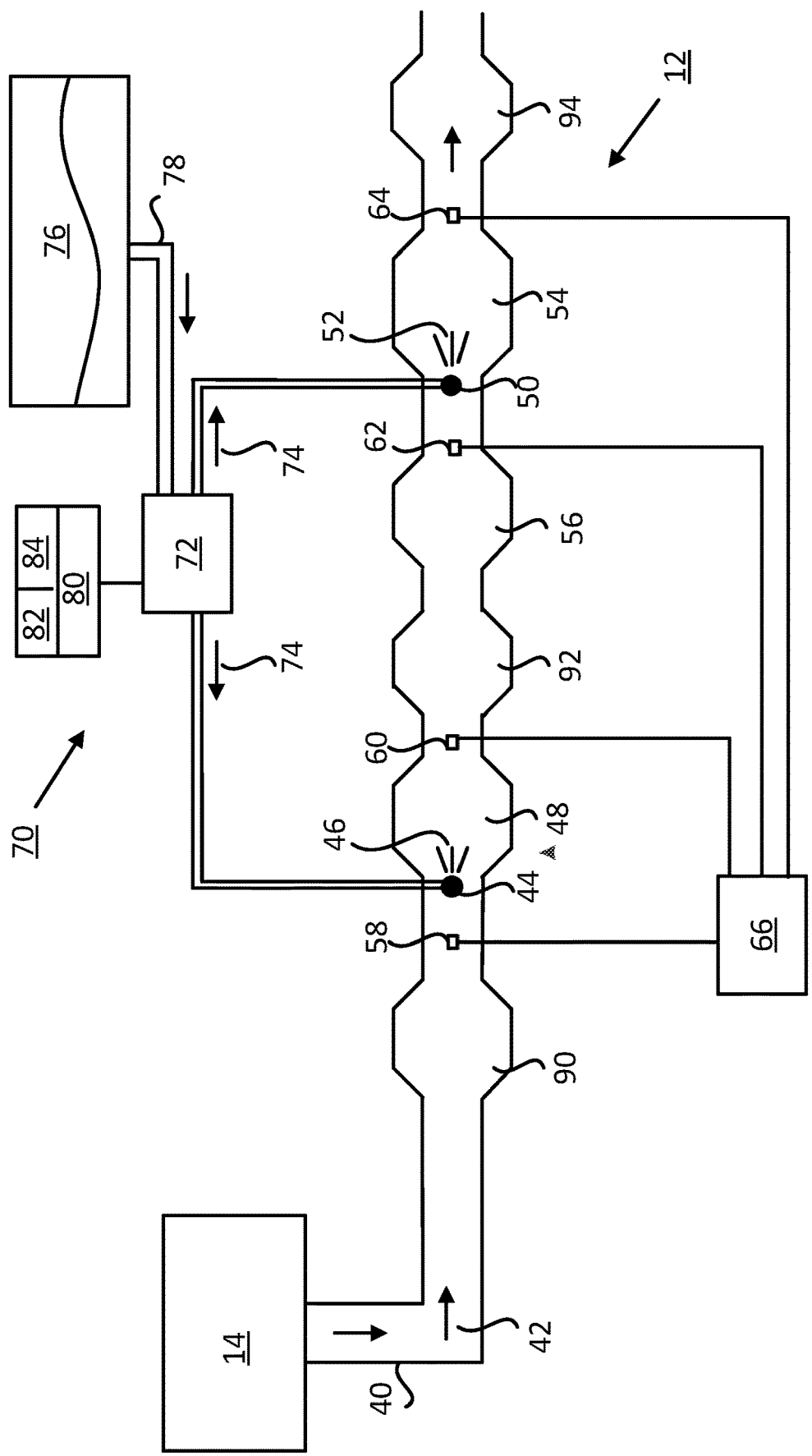
FIG. 3 shows an example of an extended exhaust treatment system which may comprise embodiments of the present invention.
Figure 4:
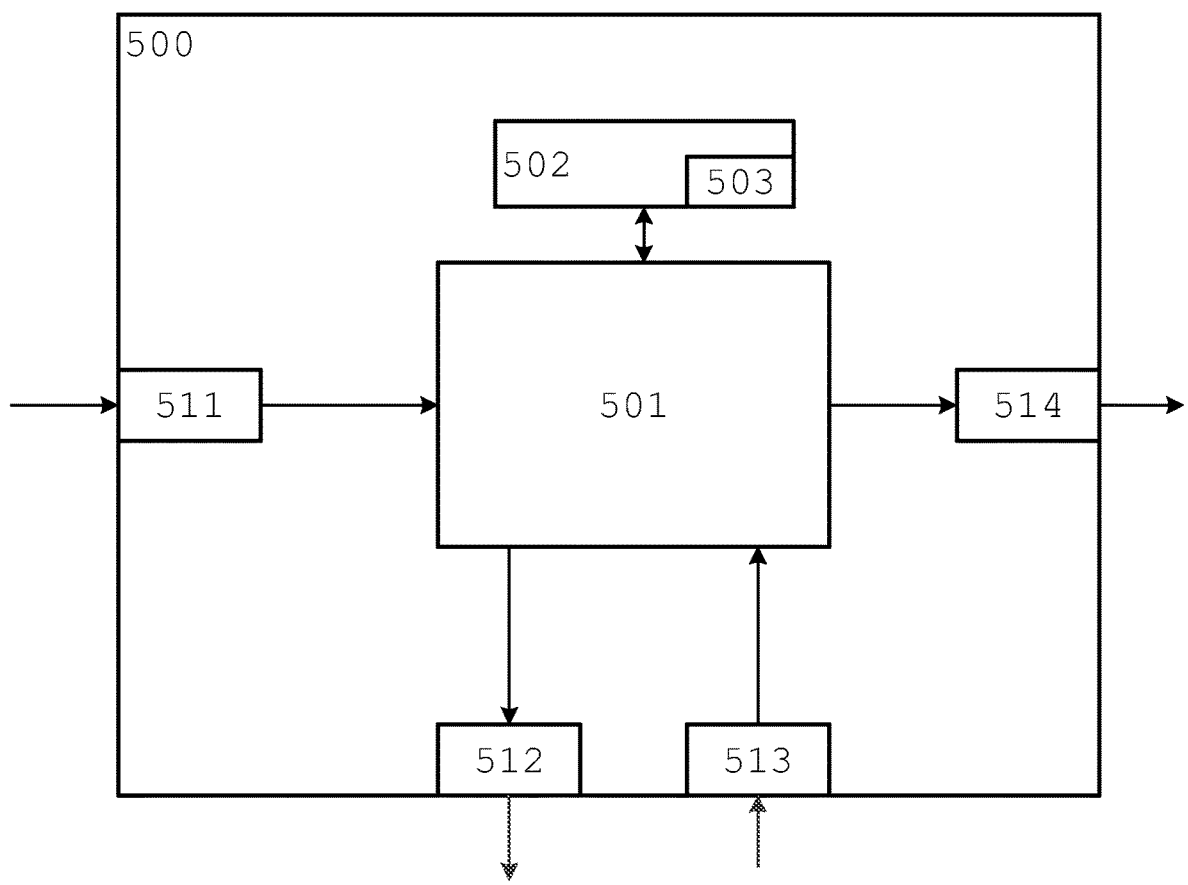
FIG. 4 shows a control device according to an embodiment of the present invention.

In addition to the first and second selective catalytic reduction catalysts, the exhaust treatment system 50 may further be provided with a diesel particulate filter, DPF, 56 for collecting soot in the exhaust stream 42. In the embodiment shown the DPF 56 is positioned between the selective catalytic reduction catalysts. it is however to be understood that the DPF may be positioned at other positions along the exhaust system. Moreover, the DPF may be integrated with one of the selective catalytic reduction catalysts, forming a catalytic particulate filter SCRF. In addition, as shown in FIG. 3, the system may comprise further optional treatment components such as for example a first diesel oxidation catalyst 90 arranged upstream of the first additive dosage device 44, a second diesel oxidation catalyst 92 arranged downstream of the first selective catalytic reduction catalyst 44 and upstream of a diesel particulate filter 56 and an ammonia slip catalyst 94 arranged downstream of the second selective catalytic reduction catalyst 54.

The exhaust treatment system 12 may also be equipped with one or several sensors, such as one or several $NO_x$—sensors 58, 60, 62, 64 and/or one or several temperature sensors 58, 60, 62, 64, which are arranged for the determination of NOx-concentrations and temperatures in the exhaust treatment system 12, respectively. For instance, one position that may be important for a $NO_x$ sensor is upstream of the second selective catalytic reduction catalyst 54 where at least one $NO_x$ sensor 62 may be placed for measuring the $NO_x$ content in the exhaust stream. Further a second NOx sensor 64 may be positioned downstream of the second selective catalytic reduction catalyst 54 for diagnostics purposes and for feedback to control systems controlling the performance of the exhaust system. The different sensors are connected to a control device 66 capable of obtaining information from the different sensors and to handle, process and transmit the information to other control devices of the vehicle 10.

The exhaust treatment system may further be arranged with a system 70, displayed schematically in FIG. 2. The system may comprise the first additive dosage device 44 and the second additive dosage device 50. The first and second additive dosage devices 44, 50, often consisting of dosage nozzles administering additive to, and mixing such additive with the exhaust stream 42, are supplied with additive by a pump 72 via conduits 74 for additive. The pump 72 obtains additive from one or several tanks 76 for additive, via one or several conduits 78 between the tank 74 and the pump 72. It should be realized here that the additive may be in liquid form and/or gaseous form. If both gaseous and liquid additives are used, several tanks and pumps are arranged, wherein at least one tank and one pump are set up to supply liquid additive, and at least one tank and one pump are set up to supply gaseous additive.

According to the embodiment shown, the pump 72 comprises a joint pump, which feeds both the first 44 and the second 50 dosage device with the first and the second additive, respectively. The specific function of the additive system 70 is well described in prior art technology, and the exact method for the injection of additive is therefore not described in any further detail herein. The system 370 for supply of additive may further comprise a dosage control device 80, arranged to control the pump 72, in such a manner that the additive is supplied to the exhaust stream. The dosage control device 80 may comprise a first pump control device 82 arranged to control the pump 72, in such a manner that a first dosage of the first additive is supplied to the exhaust stream 42, via the first additive dosage device 44. The dosage control device 80 also comprises a second pump control device 84, arranged to control the pump 72, in such a manner that a second dosage of the second additive is supplied to the exhaust stream 42, via the second additive dosage device 50.

An embodiment of the invention is intended to function as follows. During use of the vehicle 10 with the combustion engine 14, the exhaust stream 42 leaving the combustion engine 14 will enter the first selective catalytic reduction catalyst 48, and a first reduction of nitrogen oxides $NO_x$ is carried out with the help of additive supplied to the exhaust stream 42 by the first additive dosage device 44. The exhaust stream 42 is then led through the filter structure of the particulate filter 56, where soot particles are caught in the filter structure from the exhaust stream 42 passing through, and are stored and oxidized in the particulate filter 56. The exhaust stream is then led through the second selective catalytic reduction catalyst 54, which is arranged downstream of the second additive dosage device 50. The second selective catalytic reduction catalyst 54 is arranged to reduce nitrogen oxides $NO_x$ in the exhaust stream 42 through use of the second additive from the second additive dosage device 50 and, if the first additive remains in the exhaust stream 42 when this reaches the second selective catalytic reduction catalyst 54, also with the use of the first additive. In this regard the $NO_x$ conversion in the second selective catalytic reduction 54 is very important in view of that no residue must leave the second selective catalytic reduction 54 and thus the exhaust system.

As the exhaust treatment system is used components will be affected and control algorithms and thresholds may not be accurate anymore for providing the optimum exhaust treatment system performance. In particular, in this regard, it is important to have knowledge of the conditions for $NO_x$ conversions in the second selective catalytic reduction catalyst 54 in order to be able to adapt away possible errors. The adaption is preferably done with the first additive dosage device 44 by controlling it to inject additive in accordance with at least one injection rule that is designed for the adaption. The adaption of the second selective catalytic reduction catalyst may be based on several different aspects and causes. For instance, the adaption may be based on at least one measurement of a nitrogen oxides conversion rate for the second selective catalytic reduction catalyst. The measurements may then be performed by the $NO_x$ sensors positioned in the exhaust system. Other aspects that may trigger an adaption of the second selective catalytic reduction catalyst is to handle and mitigate the effects and the impacts of errors regarding the function of for instance the second additive dosage device 50 and/or the function of the second selective catalytic reduction catalyst 54. In that regard also the impact of aging of the second selective catalytic reduction catalyst 54 may be handled and mitigated by the adaption.

The adaption may be triggered by different aspects, causes and occurrences. For instance, the adaption may be triggered by a pre-set and pre-determined adaption time period. Other triggering aspects may be the measuring of nitrogen oxides downstream of the second selective catalytic reduction catalyst. The measurement could for example detect a level of $NO_x$ that is higher than a maximum allowed threshold value, $NO_x>NO_{x\_th\_max}$, which could trigger the adaption. The measurement could also detect a level of NOx that is lower than a maximum allowed threshold value, $NO_x<NO_{x\_th\_max}$, which could trigger the adaption. Also, a malfunction of the second selective catalytic reduction catalyst may trigger the adaption. Further possibilities are that a representative usage of the combustion engine could trigger the adaption. The adaption is normally set to occur during a certain predetermined time period, such as for instance a couple of minutes.

Preferably, the impact of the inhomogeneity of the exhaust stream as mentioned above is limited during the adaption of the second selective catalytic reduction catalyst when controlling the first additive dosage device. This is especially important when $NO_x$ sensors are used upstream of the second selective catalytic reduction catalyst. The injection rules for controlling the first additive dosage device may be predetermined and may include causing at least one interruption of an injection of additives by the first additive dosage device 44 or may include causing a saturation of additives in the first selective catalytic reduction catalyst 54. The aim is to minimize any measuring errors for $NO_x$ conversion in the second selective catalytic reduction catalyst 54.

As an alternative the first additive dosage device 44 may be controlled and performed such that the adaption of the second selective catalytic reduction catalyst 54 will mitigate the impact the inhomogeneity of the distribution has on the function of the second selective catalytic reduction catalyst 54. In that respect, the injection rule or rules may include one or more rules based on statistical usage data for the combustion engine. This may then include usage data that have been collected during normal use of the vehicle, i.e. representative data. This data collection is routinely performed in all modern vehicles and will therefore not be described more in detail.

FIG. 5 schematically shows a control device 500. The control device 500 comprises a calculation unit 501, which may consist of essentially a suitable type of processor or microcomputer, e.g. a circuit for digital signal processing (Digital Signal Processor, DSP), or a circuit with a predetermined specific function (Application Specific Integrated Circuit, ASIC). The calculation unit 501 is connected to a memory unit 502, installed in the control device 500, providing the calculation device 501 with e.g. the stored program code and/or the stored data, which the calculation device 501 needs in order to be able to carry out calculations. The calculation unit 501 is also set up to store interim or final results of calculations in the memory unit 502.

Further, the control device 500 is equipped with devices 511, 512, 513, 514 for receiving and sending of input and output signals, respectively. These input and output signals may contain wave shapes, pulses, or other attributes, which may be detected as information by the devices 511, 513 for the receipt of input signals, and may be converted into signals that may be processed by the calculation unit 501. These signals are then provided to the calculation unit 501. The devices 512, 514 for sending output signals are arranged to convert the calculation result from the calculation unit 501 into output signals for transfer to other parts of the vehicle's control system, and/or the component(s) for which the signals are intended.

Each one of the connections to the devices for receiving and sending of input and output signals may consist of one or several of a cable; a data bus, such as a CAN (Controller Area Network) bus, a MOST (Media Oriented Systems Transport) bus, or any other bus configuration; or of a wireless connection.

A person skilled in the art will realize that the above-mentioned computer may consist of the calculation unit 501, and that the above-mentioned memory may consist of the memory unit 502.

Generally, control systems in modern vehicles consist of a communications bus system, consisting of one or several communications buses to connect a number of electronic control devices (ECUs), or controllers, and different components localized on the vehicle. Such a control system may comprise a large number of control devices, and the responsibility for a specific function may be distributed among more than one control device. Vehicles of the type shown thus often comprise significantly more control devices than shown in FIGS. 1, 3 and 5, as is well known to a person skilled in the art within the technology area.

As a person skilled in the art will realize, the control device 500 in FIG. 5 may comprise one or several of the control devices 115 and 160 in FIG. 1, the control device 260 in FIG. 2, the control device 360 in FIG. 3 and the control device 374 in FIG. 3.

The control devices described herein are arranged to carry out the method steps described in the document. For example, these control devices may correspond to different groups of instructions, for example in the form of program code, which is fed into, and used by a processor, when the respective control device is active/used to implement the respective method steps.

The present invention, in the embodiment displayed, is implemented in the control device 500. The invention may, however, also be implemented wholly or partly in one or several other control devices, already existing in the vehicle, or in a control device dedicated to the present invention.

A person skilled in the art will also realize that the above exhaust treatment system may be modified according to the different embodiments of the method according to the invention. In addition, the invention relates to the motor vehicle 10, for example a car, a truck or a bus, or another unit comprising at least one exhaust treatment system according to the invention, such as for example a vessel or a voltage/current-generator.

The present invention is not limited to the embodiments of the invention described above, but relates to and comprises all embodiments within the scope of the enclosed independent claims.

The invention claimed is:

1. A method for adaption of an exhaust treatment system arranged for treating an exhaust stream produced by an engine, the exhaust treatment system comprising:
    a first additive dosage device;
    a first selective catalytic reduction catalyst arranged downstream of the first additive dosage device;
    a second additive dosage device arranged downstream of the first selective catalytic reduction catalyst; and
    a second selective catalytic reduction catalyst arranged downstream of the second additive dosage device,
    wherein the method for adaption of the exhaust treatment system comprises:
    performing an adaption of the second selective catalytic reduction catalyst to mitigate at least one of errors in the exhaust treatment system or an aging of the second selective catalytic reduction catalyst;
and
    actively controlling, during the adaption of the second selective catalytic reduction catalyst, the first additive dosage device to inject additive in accordance with at least one injection rule, wherein the injection rule is designed for the adaption of the second selective catalytic reduction catalyst,
    wherein when at least one of the first additive dosage device and the first selective catalytic reduction catalyst causes an inhomogeneity of a distribution of one or more compounds in the exhaust stream, the at least one injection rule is configured to cause the first additive dosage device to be controlled such that:
        an impact of the inhomogeneity of the distribution of one or more compounds in the exhaust stream is limited during the adaption of the second selective catalytic reduction catalyst by controlling elements of the exhaust treatment system that may cause disturbances during the adaptation, and/or
        the adaption of the second selective catalytic reduction catalyst mitigates an impact the inhomogeneity of the distribution of one or more compounds in the exhaust stream has on a function of the second selective catalytic reduction catalyst.

2. The method as claimed in claim 1, wherein the performing adaption of the second selective catalytic reduction catalyst includes performing at least one operation in the group:
    at least one measurement of a nitrogen oxides ($NO_x$) conversion rate for the second selective catalytic reduction catalyst;
    at least one adaption mitigating an impact of at least one bias related error;
    at least one adaption mitigating an impact of at least one error related to a function of the second additive dosage device;
    at least one adaption mitigating an impact of at least one error related to a function of the second selective catalytic reduction catalyst; and
    at least one adaption mitigating an impact of aging of the second selective catalytic reduction catalyst.

3. The method as claimed in claim 1, wherein performing the adaption is triggered by at least one in the group of:
    an end of a predetermined adaption time period $T_{adapt}$;
    a level of nitrogen oxides $NO_x$ in a tailpipe downstream of the second selective catalytic reduction catalyst higher than a maximum threshold value $NO_{x\_th\_max}$;

$NO_x > NO_{x\_th\_max}$;

a level of nitrogen oxides NOx in a tailpipe downstream of the second selective catalytic reduction catalyst is lower than a minimum threshold value $NO_{x\_th\_min}$;
    $NO_x < NO_{x\_th\_min}$;
    a malfunction of the second selective catalytic reduction catalyst; and
    a representative usage of the engine.

4. The method as claimed in claim 1, wherein, if the controlling of the first additive dosage device is performed such that an impact of the inhomogeneity of the distribution of one or more compounds in the exhaust stream is limited during the adaption of the second selective catalytic reduction catalyst, the at least one injection rule includes at least one in the group of:
    one or more predetermined injection rule;
    an injection rule causing at least one interruption of an injection of additive by the first additive dosage device; and
    an injection rule causing a saturation of additive in the first selective catalytic reduction catalyst.

5. The method as claimed in claim 1, wherein, if the controlling of the first additive dosage device is performed such that performing adaption of the second selective catalytic reduction catalyst mitigates an impact the inhomogeneity of the distribution of one or more compounds in the exhaust stream has on a function of the second selective catalytic reduction catalyst,
    the at least one injection rule includes at least one in the group of:
    one or more injection rules based on statistical usage data for the engine; and
    one or more injection rules corresponding to a normal usage of the engine.

6. The method as claimed in claim 1, wherein the first additive dosage device is a primary source of the inhomogeneity of distribution of one or more compounds in the exhaust stream.

7. The method as claimed in claim 1, further including, after the controlling of the first additive dosage device:
    measuring a nitrogen oxides NOx conversion rate for the second selective catalytic reduction catalyst.

8. The method according to claim 1, wherein the exhaust treatment system further includes one or more in the group of:
- a first diesel oxidation catalyst arranged upstream of the first additive dosage device;
- a second diesel oxidation catalyst arranged downstream of the first selective catalytic reduction catalyst and upstream of a diesel particulate filter;
- a diesel particulate filter arranged upstream of the second additive dosage device;
- a catalytic diesel particulate filter arranged upstream of the second additive dosage device, and including an ammonia slip catalyst arranged downstream of the second selective catalytic reduction catalyst;
- a first nitrogen oxides ($NO_x$) sensor arranged upstream of the first additive dosage device;
- a second nitrogen oxides ($NO_x$) sensor arranged upstream of the second additive dosage device; and
- a third nitrogen oxides ($NO_x$) sensor arranged downstream of the second selective catalytic reduction catalyst.

9. The method according to claim 8, wherein
the first selective catalytic reduction catalyst is a close coupled selective catalytic reduction catalyst (cc-SCR); and
the second selective catalytic reduction catalyst is a main selective catalytic reduction catalyst (main SCR).

10. A computer program product comprising computer program code stored on a non-transitory computer-readable medium, said computer program product used for adaption of an exhaust treatment system arranged for treating an exhaust stream produced by an engine, the exhaust treatment system comprising: a first additive dosage device; a first selective catalytic reduction catalyst arranged downstream of the first additive dosage device; a second additive dosage device arranged downstream of the first selective catalytic reduction catalyst; and a second selective catalytic reduction catalyst arranged downstream of the second additive dosage device, said computer program code comprising computer instructions to cause one or more control units to perform the following operations for adaption of the exhaust treatment system:
- performing an adaption of the second selective catalytic reduction catalyst to mitigate at least one of errors in the exhaust treatment system or an aging of the second selective catalytic reduction catalyst; and
- actively controlling, during the adaption of the second selective catalytic reduction catalyst, the first additive dosage device to inject additive in accordance with at least one injection rule being designed for the adaption of the second selective catalytic reduction catalyst,
  - wherein when at least one of the first additive dosage device and the first selective catalytic reduction catalyst causes an inhomogeneity of a distribution of one or more compounds in the exhaust stream, the at least one injection rule is configured to cause the first additive dosage device to be controlled such that:
    - an impact of the inhomogeneity of the distribution of one or more compounds in the exhaust stream is limited during the adaption of the second selective catalytic reduction catalyst by controlling elements of the exhaust treatment system that may cause disturbances during the adaptation, and/or
    - the adaption of the second selective catalytic reduction catalyst mitigates an impact the inhomogeneity of the distribution of one or more compounds in the exhaust stream has on a function of the second selective catalytic reduction catalyst.

11. A control arrangement arranged for adaption of an exhaust treatment system arranged for treating an exhaust stream produced by an engine, the exhaust treatment system including at least:
- a first additive dosage device;
- a first selective catalytic reduction catalyst arranged downstream of the first additive dosage device;
- a second additive dosage device arranged downstream of the first selective catalytic reduction catalyst; and
- a second selective catalytic reduction catalyst arranged downstream of the second additive dosage device,
the control arrangement being configured for:
- performing an adaption of the second selective catalytic reduction catalyst to mitigate at least one of errors in the exhaust treatment system or an aging of the second selective catalytic reduction catalyst; and
- actively controlling, during the adaption of the second selective catalytic reduction catalyst, the first additive dosage device to inject additive in accordance with at least one injection rule, wherein the injection rule is designed for the adaption of the second selective catalytic reduction catalyst,
  - when at least one of the first additive dosage device and the first selective catalytic reduction catalyst causes an inhomogeneity of a distribution of one or more compounds in the exhaust stream, the at least one injection rule is configured to cause the first additive dosage device to be controlled such that:
    - an impact of the inhomogeneity of the distribution of one or more compounds in the exhaust stream is limited during the adaption of the second selective catalytic reduction catalyst by controlling elements of the exhaust treatment system that may cause disturbances during the adaptation; and/or
    - the adaption of the second selective catalytic reduction catalyst mitigates an impact the inhomogeneity of the distribution of one or more compounds in the exhaust stream has on a function of the second selective catalytic reduction catalyst.

12. A vehicle including:
an exhaust treatment system arranged for treating an exhaust stream produced by an engine, the exhaust treatment system comprising:
- a first additive dosage device;
- a first selective catalytic reduction catalyst arranged downstream of the first additive dosage device;
- a second additive dosage device arranged downstream of the first selective catalytic reduction catalyst; and
- a second selective catalytic reduction catalyst arranged downstream of the second additive dosage device; and
a control arrangement arranged for adaption of the exhaust treatment system, said control arrangement being configured for:
- performing an adaption of the second selective catalytic reduction catalyst to mitigate at least one of errors in the exhaust treatment system or an aging of the second selective catalytic reduction catalyst; and
- actively controlling, during the adaption of the second selective catalytic reduction catalyst, the first additive dosage device to inject additive in accordance with at least one injection rule, wherein the injection rule is designed for the adaption of the second selective catalytic reduction catalyst, wherein when at least one of the first additive dosage device and the first selective catalytic reduction catalyst causes an inhomogeneity of a distribution of one or more compounds in the exhaust stream, the at least one injection rule is configured to cause the first additive dosage device to be controlled such that:

an impact of the inhomogeneity of the distribution of one or more compounds in the exhaust stream is limited during the adaption of the second selective catalytic reduction catalyst by controlling elements of the exhaust treatment system that may cause disturbances during the adaptation; and/or the adaption of the second selective catalytic reduction catalyst mitigates an impact the inhomogeneity of the distribution of one or more compounds in the exhaust stream has on a function of the second selective catalytic reduction catalyst.

\* \* \* \* \*